(12) United States Patent
Dominique et al.

(10) Patent No.: US 7,623,484 B2
(45) Date of Patent: Nov. 24, 2009

(54) METHODS OF MULTIPATH ACQUISITION FOR DEDICATED TRAFFIC CHANNELS

(75) Inventors: Francis Dominique, Rockaway, NJ (US); Hongwei Kong, Denville, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 576 days.

(21) Appl. No.: 11/090,064

(22) Filed: Mar. 28, 2005

(65) Prior Publication Data

US 2006/0215597 A1 Sep. 28, 2006

(51) Int. Cl.
*H04W 4/00* (2006.01)
(52) U.S. Cl. .............. 370/328; 455/522; 455/67.11; 455/226.2; 455/226.3
(58) Field of Classification Search .......... 370/328, 370/335; 455/67.11, 226.1, 226.2, 226.3, 455/522
See application file for complete search history.

(56) References Cited

U.S. PATENT DOCUMENTS

| 2002/0136278 A1 | 9/2002 | Nakamura et al. |
| 2003/0054768 A1* | 3/2003 | Challa et al. ............... 455/63 |
| 2003/0128678 A1* | 7/2003 | Subrahmanya et al. ...... 370/335 |
| 2007/0195864 A1* | 8/2007 | Jonsson et al. .............. 375/148 |

* cited by examiner

*Primary Examiner*—Temica M Beamer
(74) *Attorney, Agent, or Firm*—Harness, Dickey & Pierce, P.L.C.

(57) ABSTRACT

In a method of multipath acquisition for a dedicated traffic channel, path positions of the traffic channel that have desired signal energy for processing in a base station receiver may be determined as a function of pilot signal information and other control information contained in a control part of the traffic channel.

19 Claims, 5 Drawing Sheets

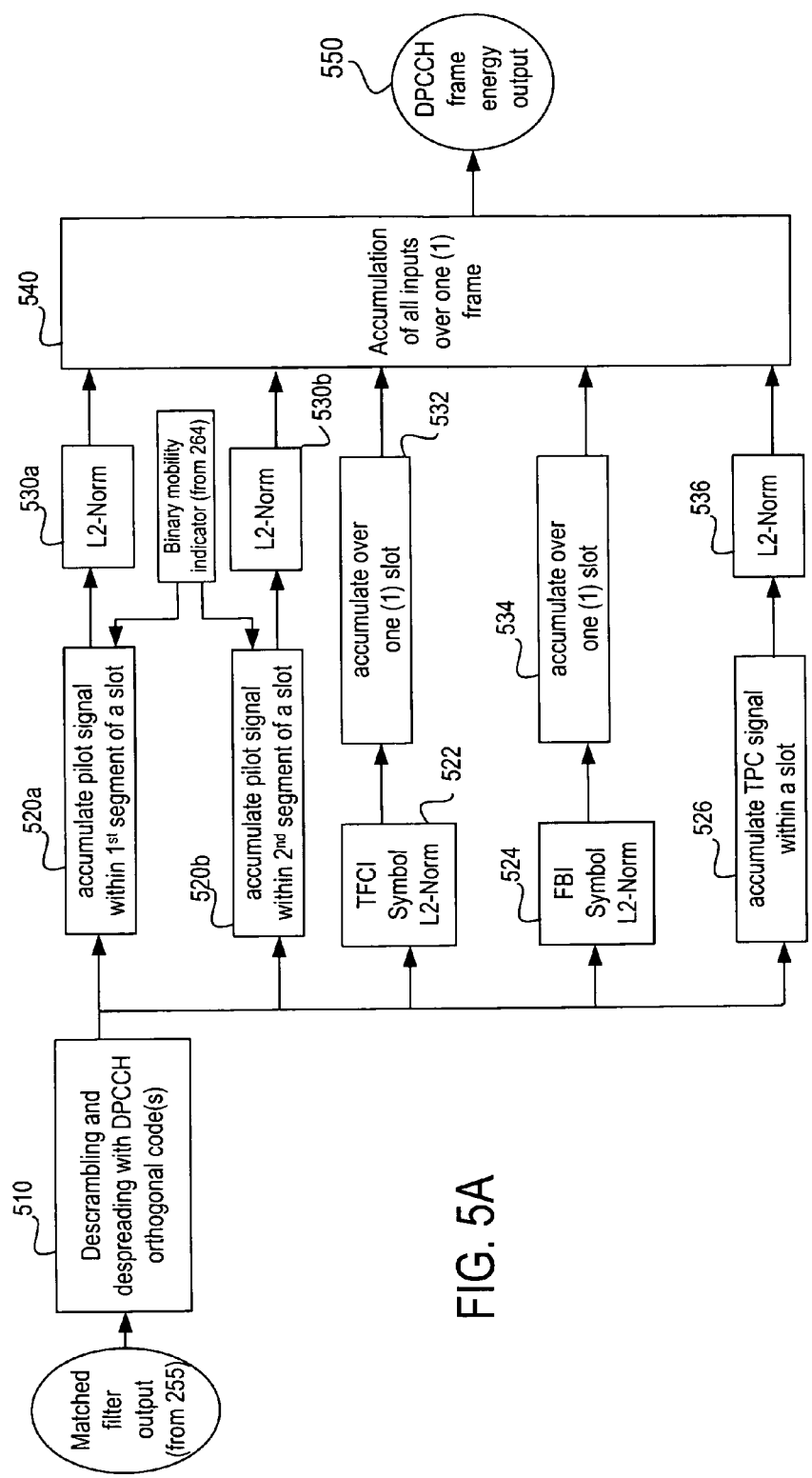
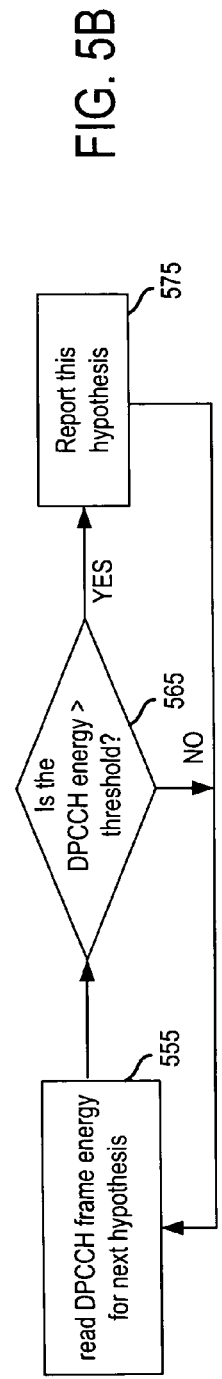
FIG. 5A
FIG. 5B

METHODS OF MULTIPATH ACQUISITION FOR DEDICATED TRAFFIC CHANNELS

BACKGROUND OF THE INVENTION

1. Field of the Invention

The present invention relates generally to multipath acquisition of dedicated traffic channels in wireless communication systems or networks.

2. Description of the Related Art

FIG. 1 is a frame structure of a dedicated traffic channel for UMTS uplink. Systems or networks designed based on third generation wireless standards such as 3GPP (UMTS) and 3GPP2 (cdma2000) use a dedicated traffic channel in the uplink for communication from mobile users (or user equipment (UE)) to the base station (or Node-B). As shown in FIG. 1, the dedicated uplink traffic channel may include two parts, a data part (Dedicated Physical Data CHannel (DPDCH) in UMTS, known as a Fundamental CHannel/Supplemental CHannel (FCH/SCH) in cdma2000), and a control part (Dedicated Physical Control CHannel (DPCCH) in UMTS, known as a pilot/power control sub-channel in cdma2000).

For the uplink DPCCH in UMTS, there are 15 slots per radio frame (i.e., processing duration corresponding to 15 slots, where the length of the frame is 38,400 chips). One radio frame is 10 ms in duration; thus each slot is 0.667 ms in duration.

The uplink DPCCH may be used to carry control information generated at Layer 1 (the physical layer). Layer 1 control information includes known pilot bits to support channel estimation for coherent detection, transmit power-control (TPC) commands, feedback information (FBI), and an optional transport-format combination indicator (TFCI). The TFCI informs the receiver about the instantaneous transport format combination of the transport channels mapped to the simultaneously transmitted uplink DPDCH radio frame.

Within each slot, the UE thus transmits pilot bits and certain control bits such as TFCI, FBI and TPC bits. Each slot has a total of ten (10) combined pilot bits and control bits. The actual combinations of bit numbers may change and may be controlled by the Radio Network Controller (RNC) at the network, for example. An example configuration may be 5 pilot bits, 2 TFCI bits, 1 FBI bits and 2 TPC bits for one slot.

The pilot bits are known to both the Node-B and the UE; the remaining control bits (TPC, FBI and TFCI) are not known to the base station (Node-B). The number of TPC bits per slot is typically either 1 or 2 bits. If there are two TPC bits in one slot, the values of the 2 bits are identical, i.e., either both TPC bits are 0 or both bits are 1. For 3GPP2 (cdma2000), the frame structure is similar to FIG. 1, although there are no TFCI and FBI bits defined in 3GPP2. For the following discussion, a conventional UMTS transmitter/receiver interface is described.

FIG. 2 is a block diagram of a conventional UMTS uplink transmitter/receiver relationship. Referring to FIG. 2, at the transmitter 200 (of the UE), the DPCCH and the DPDCH are modulated using BPSK (Binary Phase Shift Keying) at BPSK modulators 205. The DPCCH and the DPDCH are then spread by two different and orthogonal codes (Walsh codes) at 210 and weighted by corresponding gains at 215 to achieve certain power levels. The two channels are then combined (code-division multiplexed) at multiplexer 220.

The combined signal may be scrambled and filtered by a shaping filter 225 before modulated to RF (not shown for purposes of clarity) and sent through the propagation channel 230 to the base station (Node-B) receiver 250.

At the Node-B receiver 250, the received signal first passes a matched filter 255. The filtered signal may then be sent to a DPCCH and DPDCH processing block 260 to generate DPDCH soft symbols (shown generally at 262), for further processing by blocks such as turbo/convolutional decoders (not shown). The DPCCH and DPDCH processing block 260 also generates propagation channel measurements such as mobility of the UE. In FIG. 2, for example, this may be shown as a 'binary mobility indicator' 264, which may have a value of '1' to indicate a high mobility user and a value of '0' to indicate a low mobility user.

The DPCCH and DPDCH processing block 260 thus requires the knowledge of propagation paths, primarily the path positions. This knowledge is produced in the receiver 250 by a multipath acquisition block 265 and is managed by an 'existing and new paths management' block 270. The multipath acquisition block 265 searches a possible range of path positions (also occasionally referred to herein as 'paths' or 'hypotheses') and reports all positions that are determined as having significant signal energy, such as above some given threshold.

The existing and new paths management block 270 further screens the paths reported by the multipath acquisition block 265 and the paths that are already in use in the DPDCH and DPCCH processing block 260. The existing and new paths management block 270 removes repetitive paths and/or weak paths, adds new paths just discovered by the multipath acquisition block 265 and then passes the updated paths' information back to the DPDCH and DPCCH processing block 260. The frequency of the update can be programmable, depending on the design goals. For example, an update interval or frequency may be one DPCCH frame (10 ms). As will be seen below, conventional multipath acquisition uses only the pilot signal information in the DPCCH.

FIGS. 3A and 3B illustrate process flows for conventional multipath acquisition. In particular, FIGS. 3A and 3B generally describe the processing in multipath acquisition block 265 of FIG. 2. Referring to FIG. 3A, the pilot energy over a frame is calculated for a specific path position (hypothesis). Initially, the matched filter output from matched filter 255 corresponding to this hypothesis (which is a complex signal) is descrambled and despreaded (310). The pilot pattern is also removed by function 310 as well. The output symbols corresponding to pilot bits are next accumulated (320) by simple addition over each slot. The output of this block is at a slot rate, i.e., one (complex) output per slot.

Next, the L2-norm of the output from 320 is formed (330). Assuming for example that the complex output signal is $z=a+j*b$, its L2-norm may be given by $L2(z)=a^2+b^2$. The L2-norms of the accumulated pilot signal are further accumulated over the frame interval (340). The resultant output is the frame pilot energy (350).

Referring to FIG. 3B, the frame pilot energy for each hypothesis (355) is compared with a fixed pre-defined or given threshold (365). Hypotheses with frame pilot energy surpassing the threshold (output of 365 is 'YES') are reported (375) to the existing and new paths management block 270 in FIG. 2 for further processing.

The conventional approach suffers from detection performance issues in general, as it does not make use of the other control bits. Thus, conventional multipath acquisition processing generally requires more energy to achieve the same acquisition performance. This may cause higher interference levels for other users and may reduce system capacity. Moreover, conventional multipath acquisition is especially an issue for a UE with high mobility.

SUMMARY OF THE INVENTION

An example embodiment of the present invention is directed to a method of multipath acquisition for a dedicated traffic channel. In the method, path positions of the traffic channel that have desired signal energy for processing in a base station receiver may be determined as a function of pilot signal information and other control information contained in a control part of the traffic channel.

Another example embodiment of the present invention is directed to a method of multipath acquisition for a dedicated traffic channel. In the method, path positions of the traffic channel that have desired signal energy for processing in a base station receiver may be determined from control bits in a control part of the traffic channel including pilot signal bits and one or more of transmit power control (TPC) bits, feedback information (FBI) bits and transport-format combination (TFCI) bits.

Another example embodiment of the present invention is directed to a method of calculating frame energy of a dedicated uplink traffic channel frame for multipath acquisition of one or more path positions of the frame that are received by a base station receiver. In the method, a filtered output of a traffic channel frame received by the base station receiver, which corresponds to a given path position, may be descrambled and despread into a plurality of output symbols corresponding to control information in a control part of the frame. Output symbols corresponding to pilot signal bits may be accumulated within a slot of the frame and symbols corresponding to one or more of transmit power control (TPC) bits, feedback information (FBI) bits and transport-format combination (TFCI) bits may be accumulated in the given slot, and L2 norms may be calculated for the pilot symbols and one or more of the TPC, FBI and TFCI symbols over the slot. The calculated L2 norms of the accumulated symbols for the pilot signal and one or more of the TPC, FBI and TFCI bits may be accumulated over the traffic channel frame to determine the traffic channel frame energy for the given path position.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus are not limitative of the example embodiments of the present invention.

FIGS. 5A and 5B illustrate process flows for multipath acquisition of a dedicated traffic channel in accordance with another example embodiment of the present invention.

DETAILED DESCRIPTION OF THE EXAMPLE EMBODIMENTS

Although the following description relates to multipath acquisition for a dedicated traffic channel in a network based on UMTS technologies and/or related standards, and will be described in this example context, the example methodology may be applicable to any of CDMA (IS95, cdma2000 and various technology variations), various UMTS technologies and/or standards (release 99, R4, R5, R6 and above), GSM, 802.11 and/or related technologies Thus, the example embodiments shown and described herein are meant to be illustrative only and not limiting in any way. As such, various modifications will be apparent to those skilled in the art for application to wireless communication systems or networks based on technologies other than the above, which may be in various stages of development and intended for future replacement of, or use with, the above networks or systems.

As used herein, the term user equipment (UE) may be synonymous to a mobile, mobile station, mobile user, user, subscriber, wireless or access terminal and/or remote station, etc., for example, and may describe a remote user of wireless resources in a wireless communication network. Where used below, the term Node-B is synonymous with base transceiver station, base station, access point, etc. and may describe equipment that provides voice and/or data connectivity between a communication network and one or more mobile stations. Occasionally herein the terms Node-B and base station may be used interchangeably.

As discussed above, the conventional process for multipath acquisition for a dedicated traffic channel uses only the pilot signal transmitted in the control part of the traffic channel, and attempts to detect the energy of the pilot signal. However, multi-path acquisition performance may be improved if other control information (such as TPC, FBI and TFCI bits) is included in the calculation of the frame energy.

Accordingly, a revised energy metric may be calculated. Instead of calculating pilot frame energy, a 'DPCCH frame energy' metric may be calculated over a frame interval. Calculating DPCCH frame energy may be desirable for compressed-mode, since some slots in a frame may be silent in this mode. (As is known, the compressed-mode is for a single-tuner UE, where some slots for UMTS transmission have to be muted because the UE has to tune itself to search for other signals, such as GSM, to prepare for a possible handoff. For a dual-tuner UE, this is not an issue but a dual-tuner is rare due to its power consumption and cost) Accordingly, collecting as much signal energy information as possible in the multipath acquisition block 260 may improve the probability of discovering new paths.

Figure 3A:
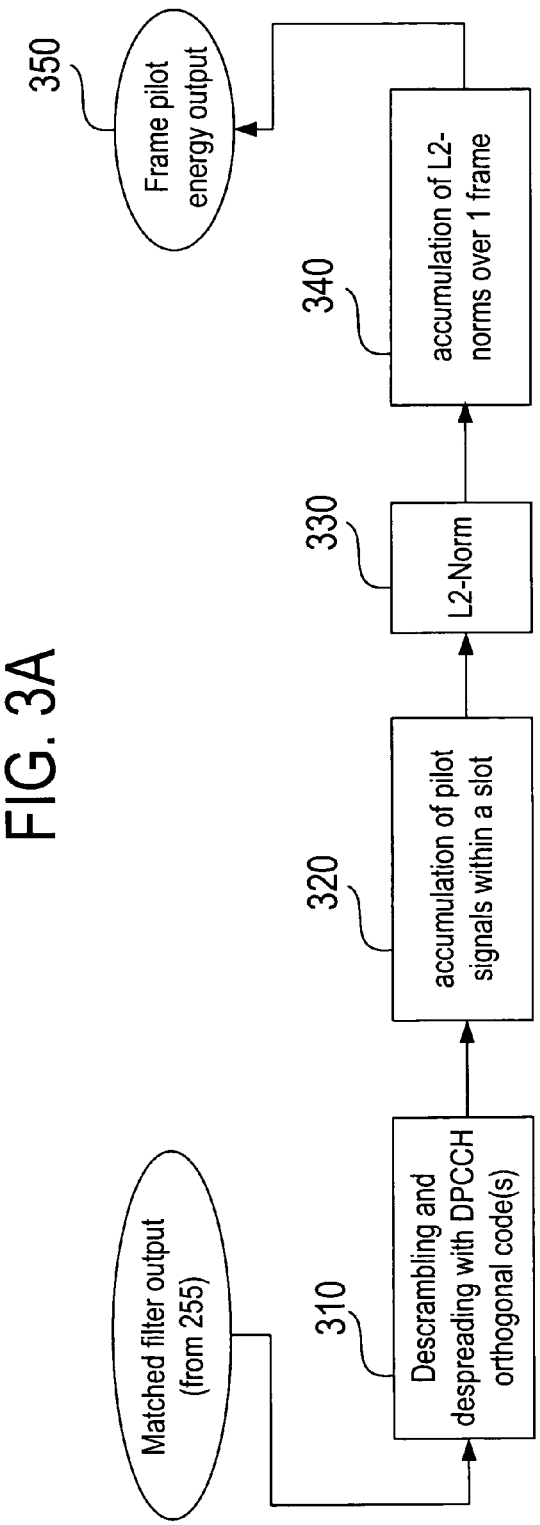
FIGS. 3A and 3B illustrate process flows for conventional multipath acquisition.
Figure 3B:
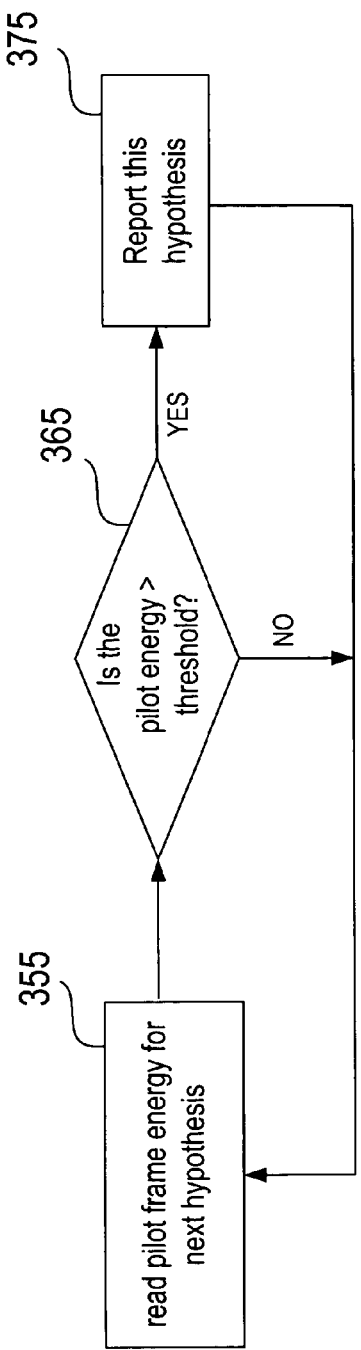
Figure 4A:
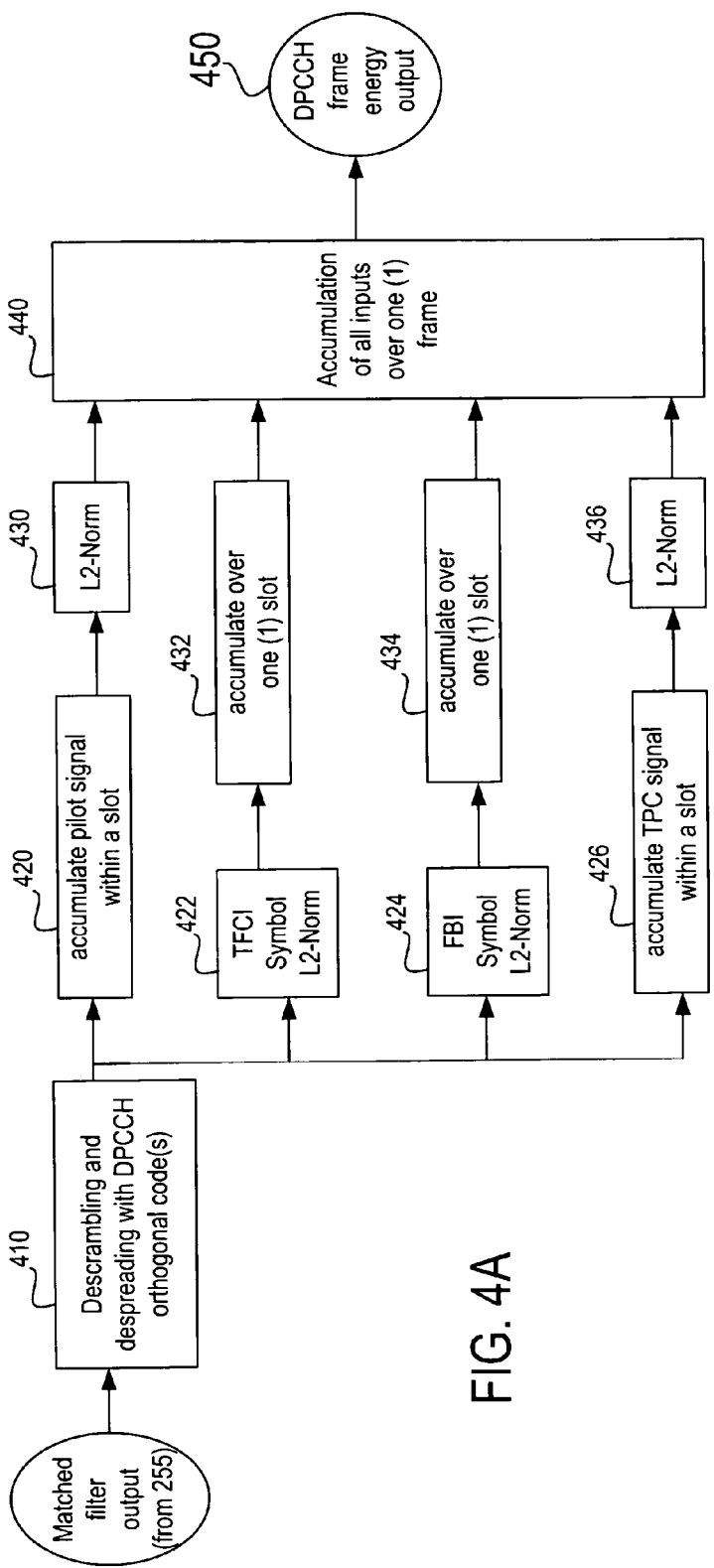
FIGS. 4A and 4B illustrate process flows for multipath acquisition of a dedicated traffic channel in accordance with an example embodiment of the present invention.
Figure 4B:
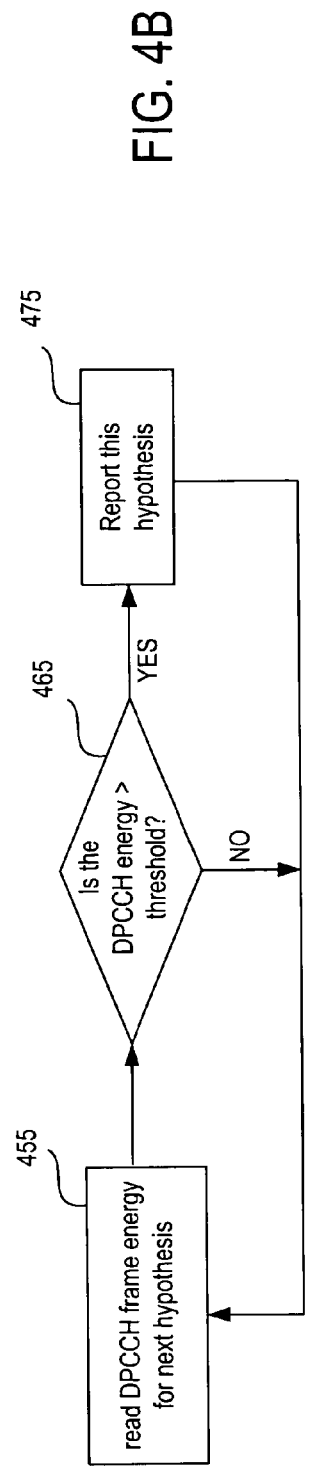

FIGS. 4A and 4B illustrate process flows for multipath acquisition of a dedicated traffic channel in accordance with an example embodiment of the present invention. FIG. 4A illustrates a modified multipath acquisition processing flowchart. The hypotheses reporting flowchart in FIG. 4B is essentially the same as in FIG. 3B. Referring to FIG. 4A, and in addition to the original pilot processing at 420 and 430, three additional processing block groups have been added for processing control information such as output symbols corresponding to TFCI bits (422 and 432), FBI bits (242 and 434) and TPC bits (at 426 and 436).

Referring again to FIG. 4A, as TFCI and FBI control bits in a given slot are unknown to the Node-B, output symbols corresponding to these control bits cannot be accumulated (see 432 and 434) prior to the L2-norm calculations at 422 and 432. Otherwise, the signals may cancel one another due to opposite-polarity signs of the symbols. On the other hand, the Node-B knows that if there are multiple TPC bits in one slot, they have to be identical. Therefore, the output symbols corresponding to the TPC bit(s) in a slot may be accumulated (426) prior to being subject to the L2-norm calculation (436), in the same way as the pilot symbols are processed. Since additional energy is collected, the probability that new paths are discovered and existing paths are maintained may be increased. Equivalently, if it is desirous to maintain the same probability of detection and or maintain the paths, the UE now can transmit as a lower power level, therefore reducing interference to other users in the cell. This may translate to system capacity increases, for example.

FIGS. 5A and 5B illustrate process flows for multipath acquisition of a dedicated traffic channel in accordance with another example embodiment of the present invention. Functional blocks in FIGS. 5A and 5B are similar to FIGS. 4A and 4B, therefore only the differences are described in detail for purposes of brevity.

Present and future 3GPP/3GPP2 wireless communication systems should be able to support high mobility users. One example application is a user making phone calls from a high-speed train. The record velocity on a commercial high-speed train is the MEGLEV in Shanghai, China, which travels at speeds in excess of 480 Km per hour. For this velocity, the maximum frequency shift for a UMTS system operating in the 2 GHz band is around 2 KHz.

Taking half a cycle of a sinusoid as the coherence interval, then with this frequency shift there is a coherence interval of about 0.25 ms. This presents a substantial challenge to the pilot signal processing blocks 320-340 in FIG. 3A (and in pilot signal processing blocks 420-430 of FIG. 4A) because the pilot accumulation interval in one slot may exceed the coherence interval of the channel by a substantially large margin. For example, in UMTS, there may be a maximum of 8 pilot symbols per slot, out of the 10 total symbols in that slot. The pilot interval in this case is 0.5333 ms, larger than the 0.25 ms cycle of the frequency shift. In this case, if the pilot signals are still accumulated in the slot, the signal energy is more or less cancelled to zero (considering the accumulation sinusoidal in one cycle, the output is zero). Therefore, a modification may be made to the pilot processing blocks of FIGS. 3A and 4A so as to more efficiently handle high mobility UEs.

To handle frequency shifts as high as 2 KHz, the pilot signal may be bi-sected or divided into two segments (520a, 520b). One segment may consist of four (4) pilot symbols, which would have an interval of 0.26667 ms and would barely satisfy the coherence interval for 2 KHz, but nonetheless maximizes the coherence accumulation gain. The other segment has 4 or fewer pilot symbols, with an interval less than or equal to 4 symbols ($\leq 0.26667$ ms) since in 3GPP the largest number of pilot symbols in a slot is 8. The pilot symbols within each segment may be accumulated (520a, 520b) before the calculation of their corresponding L2-norms (530a, 530b). FIG. 5A thus illustrates processing for mobility-resistant multipath acquisition.

Figure 1:
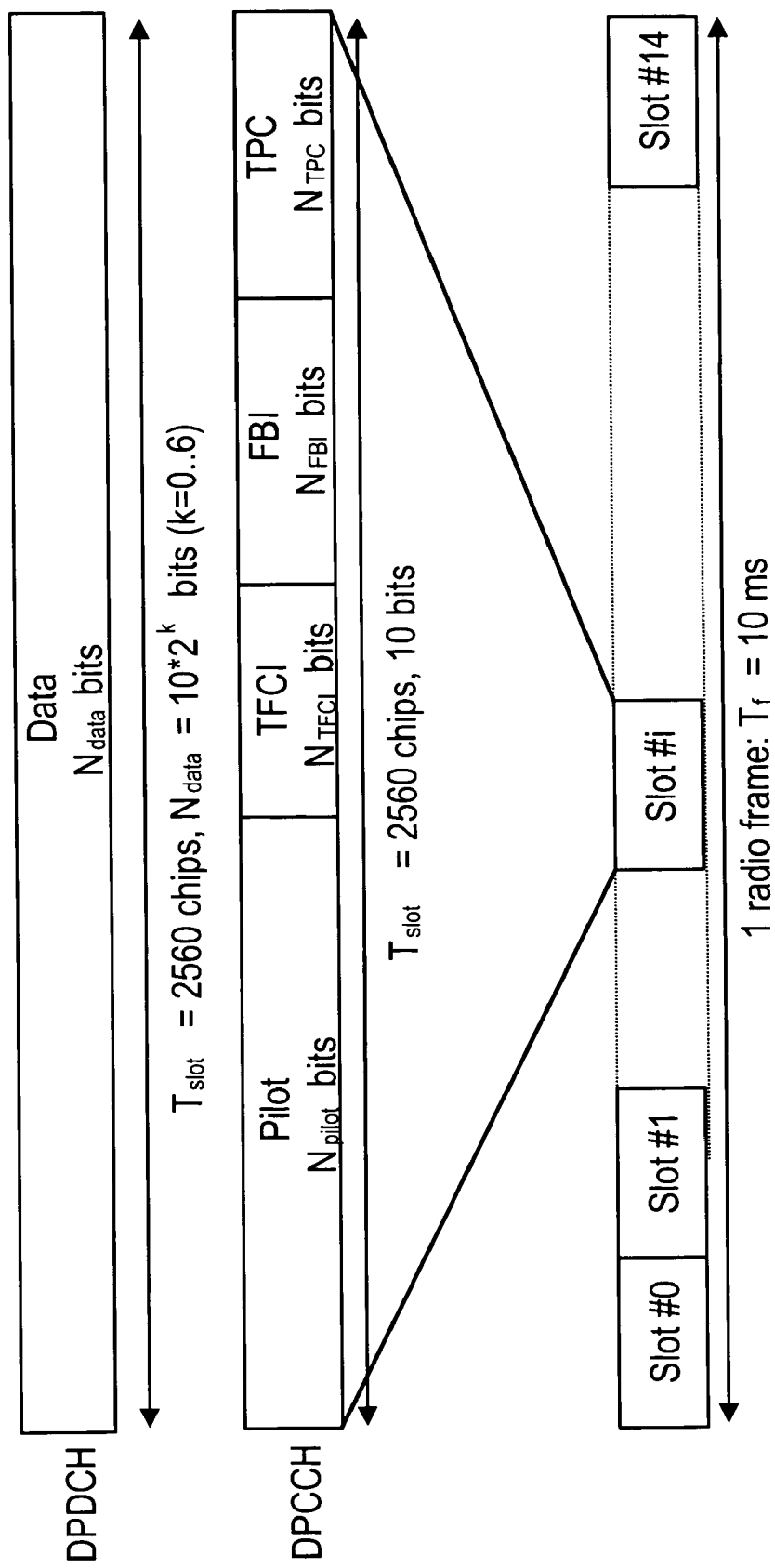
FIG. 1 is a frame structure of a dedicated traffic channel for UMTS uplink.
Figure 2:
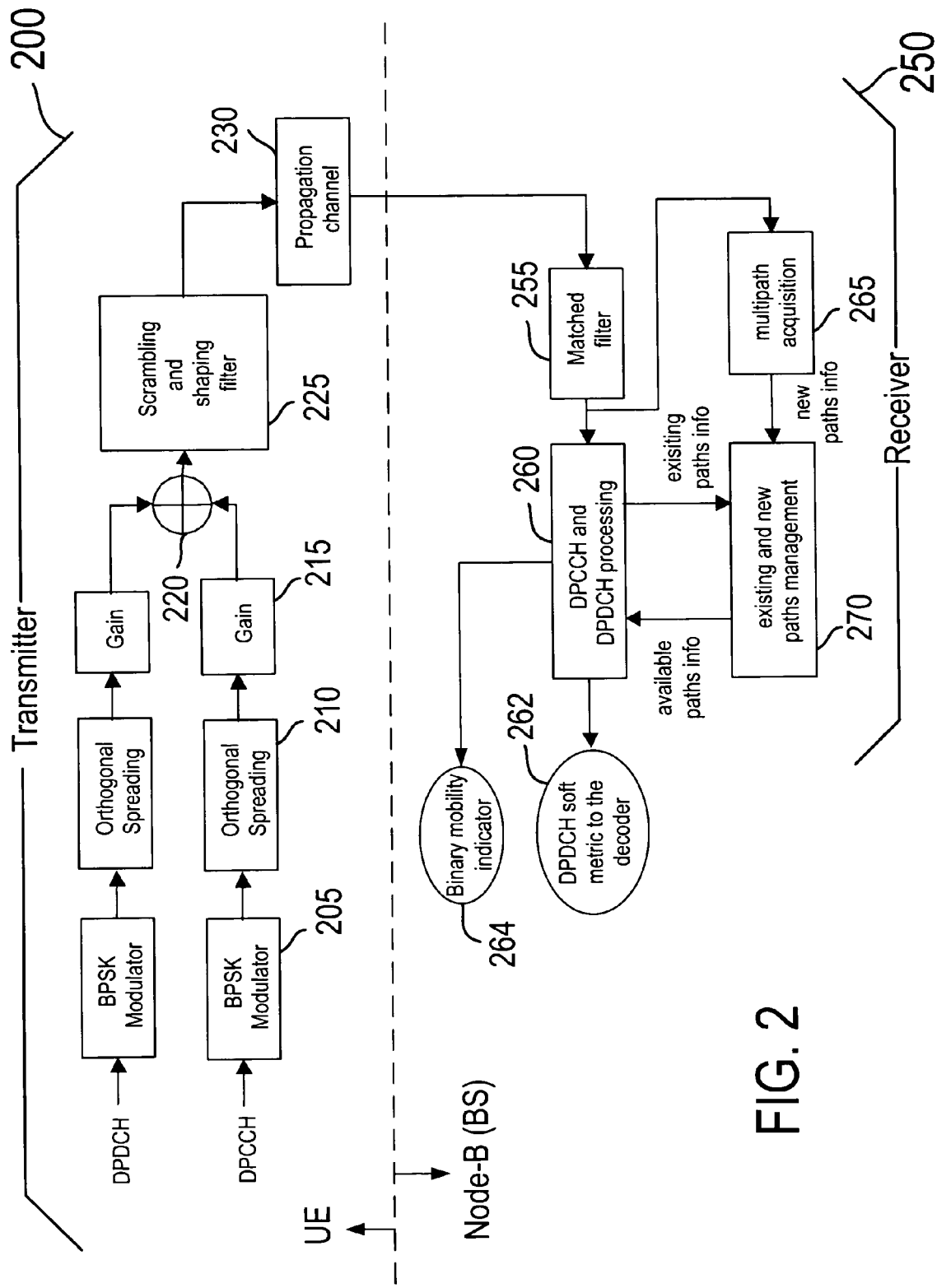
FIG. 2 is a block diagram of a conventional UMTS uplink transmitter/receiver relationship.

As shown in FIG. 5A, the binary mobility indicator 264 from FIG. 2 may be used to decide whether a bisect segmentation is needed or not. This preserves the acquisition performance for lower or low mobility users, as lower or low mobility users would not require segmentation on the pilot signals in a slot, and therefore would retain higher coherent accumulation gain. Thus, binary mobility indicator information may be used to improve multipath acquisition performance for high mobility users while retain the high performance gain from coherent pilot combining for low mobility users.

The above methodology may be employed for any network based on one or more of UMTS (release 99, R4, R5, R6 and above), and may be adaptable for CDMA (IS95, cdma2000 and various technology variations), GSM, 802.11 and/or related technologies (such as 802.15 and 802.16), including communication systems or networks based on technologies other than the above (such as cdma2000 1x EVDO Rev B and UMTS Release 7), which may be in various stages of development and intended for future replacement of, or use with, the above networks or systems.

The example embodiments of the present invention being thus described, it will be obvious that the same may be varied in many ways. Such variations are not to be regarded as departure from the spirit and scope of the example embodiments of the present invention, and all such modifications as would be obvious to one skilled in the art are intended to be included within the scope of the following claims.

What is claimed is:

1. A method of multipath acquisition, at a base station receiver, for a dedicated uplink traffic channel, the method comprising:

calculating a frame energy metric of a control part of the traffic channel for each of a plurality of path positions received by the base station receiver, wherein the calculating the frame energy metric for each of the plurality of path positions includes, descrambling and despreading a filtered output of a traffic channel frame received by the base station receiver into a plurality of output symbols corresponding to control information in the control part of the traffic channel frame, the traffic channel frame corresponding to a given one of the plurality of path positions, and the control information including at least transmit power control (TPC) bits;

accumulating output symbols corresponding to pilot signal bits within a slot of the traffic channel frame and output symbols corresponding to TPC bits within a slot of the traffic channel frame, calculating L2 norms for the accumulated output pilot symbols and L2 norms for the accumulated output TPC symbols, and accumulating the L2 norms to generate the frame energy metric for a given one of the plurality of path positions;

comparing the frame energy metric for each path position to a threshold; and reporting the path positions with a frame energy metric exceeding the threshold to processing circuitry within the base station receiver.

2. The method of claim 1, wherein accumulating pilot signal output symbols further includes, dividing the pilot signal into two segments and separately accumulating output symbols corresponding to the given segment, and wherein calculating L2 norms for the accumulated pilot symbols further includes separately calculating L2 norms for the accumulated pilot symbols corresponding to the given segment of the pilot signal.

3. The method of claim 2, wherein whether or not to divide the pilot signal is based on a value of a binary mobility indicator bit which indicates the relative mobility of a user transmitting the traffic channel frame on the uplink.

4. The method of claim 1, wherein calculating the frame energy metric for the given path position further includes:

calculating L2 norms for output symbols corresponding to FBI bits over a slot of the frame and L2 norms for output symbols corresponding to TFCI bits over a slot of the frame, and accumulating the calculated L2 norms for the FBI output symbols over the slot and the calculated L2 norms for the TFCI output symbols over the slot.

5. The method of claim 4, wherein calculating the frame energy metric for the given path position further includes:
accumulating the calculated L2 norms for the accumulated pilot signal output symbols within the slot, the calculated L2 norms for the accumulated TPC output symbols within the slot, the accumulated, calculated L2 norms for the FBI output symbols over the slot, and the accumulated, calculated L2 norms for the TFCI output symbols over the slot to calculate the frame energy metric for the given path position.

6. A method of multipath acquisition, at a base station receiver, for a dedicated uplink traffic channel, comprising:
calculating a frame energy metric of a control part of a traffic channel for each of a plurality of path positions received by the base station receiver, the frame energy metric for the control part being calculated by accumulating output symbols corresponding to pilot signal bits within a slot of the traffic channel frame and symbols corresponding to one or more of transmit power control (TPC) bits, feedback information (FBI) bits and transport-format combination (TFCI) bits within the slot of the traffic channel frame;
comparing the frame energy metric for each path position to a threshold; and
determining path positions of the traffic channel that have desired signal energy for processing in a base station receiver based on the comparing step.

7. The method of claim 6, further comprising:
reporting the path positions with a frame energy metric exceeding the threshold to processing circuitry within the base station receiver.

8. The method of claim 6, wherein each path position is determined based on whether a calculated frame energy metric for the control part for each path position exceeds a threshold.

9. A method of calculating frame energy of a dedicated uplink traffic channel frame for multipath acquisition of one or more path positions of the frame that are received by a base station receiver, comprising
descrambling and despreading a filtered output of a traffic channel frame received by the base station receiver, which corresponds to a given path position, into a plurality of output symbols corresponding to control information in a control part of the frame,
accumulating output symbols corresponding to pilot signal bits within a slot of the frame and symbols corresponding to one or more of transmit power control (TPC) bits, feedback information (FBI) bits and transport-format combination (TFCI) bits in the given slot, and
calculating L2 norms for the pilot symbols and one or more of the TPC, FBI and TFCI symbols over the slot, wherein the calculated L2 norms of the accumulated symbols for the pilot signal and one or more of the TPC, FBI and TFCI bits are accumulated over the traffic channel frame to determine the traffic channel frame energy for the given path position.

10. The method of claim 9, wherein
a calculated frame energy metric for each path position is compared to a threshold, and
path positions having a frame energy metric exceeding the threshold are reported to processing circuitry within the base station receiver.

11. The method of claim 9,
wherein accumulating pilot signal output symbols further includes dividing the pilot signal into two segments and separately accumulating output symbols corresponding to the given segment, and
wherein calculating L2 norms for the accumulated pilot symbols further includes separately calculating L2 norms for the accumulated pilot symbols corresponding to the given segment of the pilot signal.

12. The method of claim 11, wherein whether or not to divide the pilot signal is based on a value of a binary mobility indicator bit which indicates the relative mobility of a user transmitting the traffic channel frame on the uplink.

13. A method of multipath acquisition, at a base station receiver, for a dedicated uplink traffic channel, comprising:
calculating a frame energy metric of a control part of a traffic channel for each of a plurality of path positions received by a base station receiver, the frame energy metric for the control part being calculated by accumulating output symbols corresponding to pilot signal bits within a slot of a traffic channel frame and output symbols corresponding to power control bits within the slot of the traffic channel frame;
comparing the frame energy metric for each path position to a threshold; and
determining path positions of the traffic channel that have desired signal energy for processing in a base station receiver based on the comparing step.

14. The method of claim 13, wherein each path position is determined based on whether a calculated frame energy metric for the control part for each path position exceeds a threshold.

15. The method of claim 13, wherein the uplink traffic channel includes a data part in addition to the control part.

16. The method of claim 15, wherein the data part is one of one of a Dedicated Physical Data CHannel (DPDCH) or a Fundamental CHannel/Supplemental CHannel (FCH/SCH), and the control part is one of a Dedicated Physical Control CHannel (DPCCH) or a pilot/power control sub-channel.

17. The method of claim 13, wherein the power control bits are transmit power control (TPC) bits.

18. The method of claim 13, wherein the control information in the control part includes one or more feedback information (FBI) bits.

19. The method of claim 13, wherein the control information in the control part includes one or more transport-format combination (TFCI) bits.

* * * * *

UNITED STATES PATENT AND TRADEMARK OFFICE
CERTIFICATE OF CORRECTION

PATENT NO. : 7,623,484 B2  Page 1 of 1
APPLICATION NO. : 11/090064
DATED : November 24, 2009
INVENTOR(S) : Francis Dominique et al.

It is certified that error appears in the above-identified patent and that said Letters Patent is hereby corrected as shown below:

Title page, item (75) Inventors should read as follows:
Francis Dominique, Rockaway, NJ (US)
Hongwei Kong, Denville, NJ (US)

Signed and Sealed this

Nineteenth Day of January, 2010

David J. Kappos
*Director of the United States Patent and Trademark Office*

UNITED STATES PATENT AND TRADEMARK OFFICE
CERTIFICATE OF CORRECTION

PATENT NO.        : 7,623,484 B2                                          Page 1 of 1
APPLICATION NO.   : 11/090064
DATED             : November 24, 2009
INVENTOR(S)       : Dominique et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1076 days.

Signed and Sealed this

Fourteenth Day of December, 2010

David J. Kappos
*Director of the United States Patent and Trademark Office*